(12) United States Patent
Franda et al.

(10) Patent No.: US 7,257,985 B2
(45) Date of Patent: Aug. 21, 2007

(54) APPARATUS AND METHOD FOR REAL TIME DETERMINATION OF DENSITY AND RELATED PARAMETERS IN MANUFACTURING PROCESSES

(75) Inventors: Robert Josef Franda, Sherwood, WI (US); Qingyuan Chen, Appleton, WI (US)

(73) Assignee: Appleton Papers Inc., Appleton, WI (US)

( * ) Notice: Subject to any disclaimer, the term of this patent is extended or adjusted under 35 U.S.C. 154(b) by 722 days.

(21) Appl. No.: 10/644,994

(22) Filed: Aug. 21, 2003

(65) Prior Publication Data

US 2005/0043900 A1   Feb. 24, 2005

(51) Int. Cl.
  G01N 5/00   (2006.01)
  G01N 7/00   (2006.01)
  G01N 37/00  (2006.01)
(52) U.S. Cl. .................. 73/19.05; 73/19.01; 73/19.1; 73/23.33; 73/25.04; 73/29.01
(58) Field of Classification Search .... 73/19.01–19.06, 73/19.09, 19.1, 19.11, 23.33, 25.04, 28.01, 73/29.01, 30.01, 31.01; 137/87.01, 91, 92; 366/140–142; 702/23–25
See application file for complete search history.

(56) References Cited

U.S. PATENT DOCUMENTS 3,731,530 A * 5/1973 Tanguy et al. ............ 73/152.42
3,939,693 A * 2/1976 Dumont .................... 73/19.05
4,056,002 A * 11/1977 Arieh et al. .............. 73/861.04

(Continued)

OTHER PUBLICATIONS

Bergman et al., "On-Line Measurement of Coating Color Quality in Coater Supply System", 1999 TAPPI Coating Conference, Toronto, Canada, 1999 (16 pages).

(Continued)

*Primary Examiner*—Hezron Williams
*Assistant Examiner*—David A. Rogers
(74) *Attorney, Agent, or Firm*—Birch, Stewart, Kolasch & Birch, LLP

(57) ABSTRACT

Methods and apparati for measuring entrained gas content. One of the disclosed apparatus embodiments includes a chamber and piping for process fluid, the piping including two different sectors each comprising a density and temperature gauge having a pressure gauge located upstream and a second pressure gauge located downstream, the two sectors being operatively joined together by a pressure-changing device. The pressure measurement feature may be incorporated into the combination density and temperature gauge, eliminating the need for separate pressure gauges. Data generated by this invention reduces measurement error caused by the dissolving or exsolving of gases with changes in pressure of a fluid, while providing instantaneous measurement, through apparatuses that measure system conditions at each of two pressure states within a very short period of time. For instance, in the context of continuously coating a substrate, the method of this invention comprises: a.) setting a quantitative target for weight-% of one or more solids, e.g. kaolin clay, calcium carbonate, titanium dioxide, or alumina trihydrate, to be coated onto a substrate such as a paper web; b.) continuously applying the solids to the substrate via a carrier fluid; c.) measuring the apparent density of the slurry; d.) determining the true density of the slurry; e.) calculating the weight-% of solids in the slurry as disclosed above; f.) comparing the calculated weight-% solids to the target weight-% solids; and, g.) if the calculated weight-% is greater or less than the target weight-%, lowering or raising the amount of solids applied in step b.). Many other method and apparatus embodiments are also disclosed.

5 Claims, 7 Drawing Sheets

Single core-module apparatus for dynamic state measurement

U.S. PATENT DOCUMENTS

| | | | |
|---|---|---|---|
| 4,168,624 A | * | 9/1979 | Pichon ........................ 73/195 |
| 4,516,580 A | * | 5/1985 | Polanyi ...................... 600/364 |
| 4,584,866 A | * | 4/1986 | Janssen ...................... 73/19.1 |
| 4,862,729 A | * | 9/1989 | Toda et al. ................ 73/19.05 |
| 4,924,695 A | * | 5/1990 | Kolpak ...................... 73/19.01 |
| 5,041,990 A | * | 8/1991 | Yabumoto et al. ............ 702/24 |
| 5,365,435 A | | 11/1994 | Stephenson ................. 364/420 |
| 5,635,631 A | * | 6/1997 | Yesudas et al. ............ 73/61.46 |
| 6,496,781 B1 | * | 12/2002 | Chen et al. ................... 702/25 |

OTHER PUBLICATIONS

Mütek News, No. 7, Aug. 2001 (4 pages).

Pulse))))Air_V3, www.papec.com, Dec. 21, 2001 (3 pages).

Anton Paar, "On-line CO2 measurement in the beer and soft drink industry", Press Release, Jul. 2001 (3 pages).

* cited by examiner

Density of entrained air-containing coating slurry
as function of ambient pressure at equilibrium and transient states Dual core-module apparatus for continuous measurement Single core-module apparatus for dynamic state measurement Coating application system Application of system to a Fruit Canning line Entrained air measurement installed in both inlet and outlet of deaerator for quantitative determination of deaeration efficiency

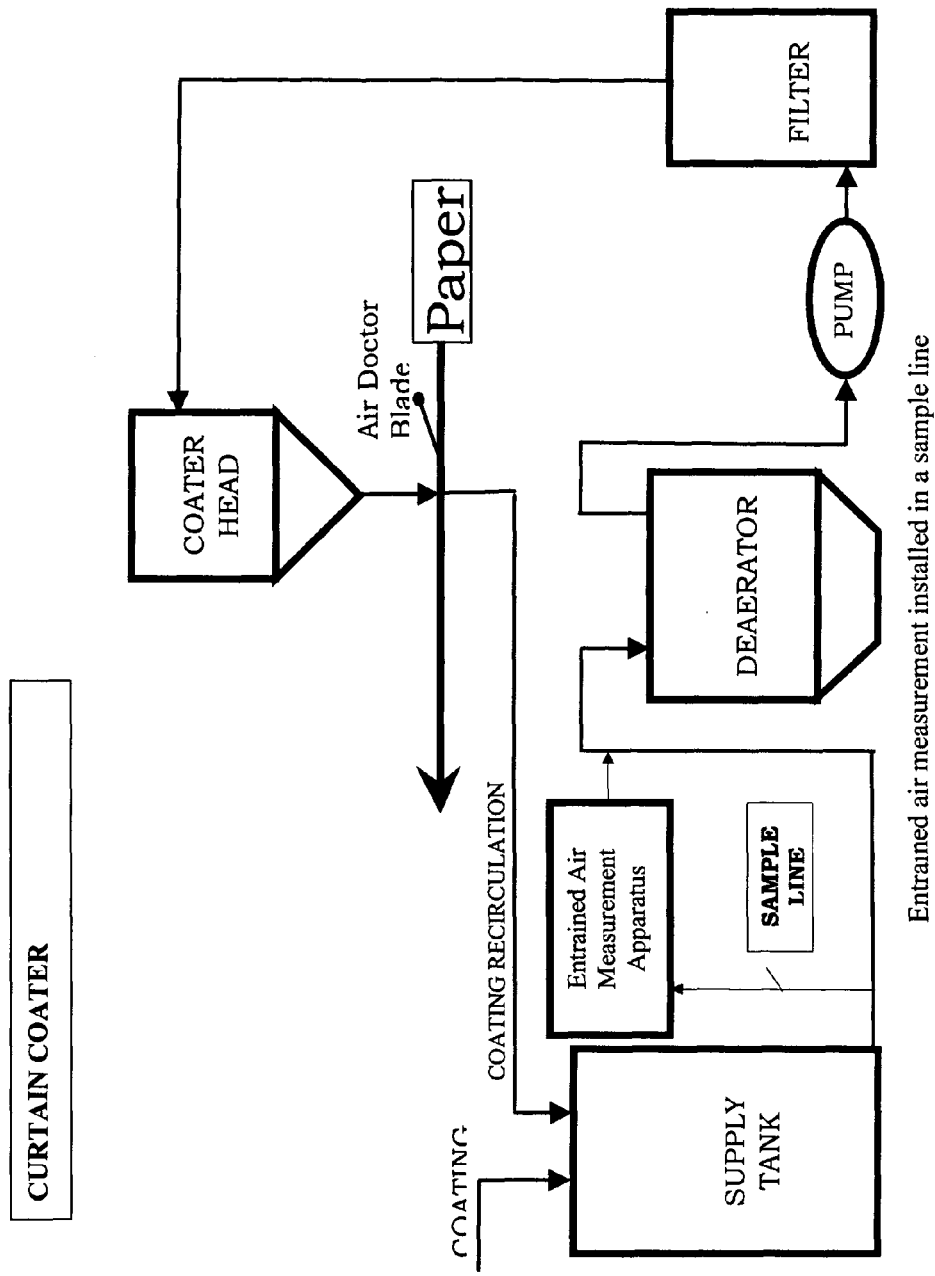
Figur 7

APPARATUS AND METHOD FOR REAL TIME DETERMINATION OF DENSITY AND RELATED PARAMETERS IN MANUFACTURING PROCESSES

FIELD OF THE INVENTION

This invention provides means for improving control of continuous processes that handle 2 or 3 phase fluids, and therefore provides benefits to manufacturers by enabling them to effectively monitor and operate their processes. Data generated by this invention can be used to control the True (air-free) or Apparent (air-containing) Density or Entrained Air content of liquids within optimum ranges, for instance in paper coating processes and in the manufacture of such products as food products (ketchup, ice cream, syrup), personal care products (skin cream, shampoo), pharmaceutical products, paints, petroleum blends, and the like. This invention is useful in any industry where information pertaining to liquid density or entrained air and other gases is employed to optimize industrial processing.

BACKGROUND OF THE INVENTION

Those skilled in the arts of processing liquids desire to know how much air and/or other gases are entrapped therein for a variety of reasons. Entrapped air can cause undesired foaming during processing, e.g. in papermaking and in the preparation of foodstuffs, and can result in disruption of film products, e.g. from paints. Entrained gases distort such processing parameters as density, making precise control of processes impossible. U.S. Pat. No. 5,365,435 illustrates the utilization of slurry density determination in fluid processing at an oil well site.

Those skilled in the art know that, generally, the more viscous a fluid being processed, the more difficult it is for any entrained air to escape from it and consequently the greater the amount of air bubbles likely to be accumulated therein. Also, as pressure on a fluid is lowered or temperature of a fluid is raised, dissolved air or other gas therein tends to leave solution and form bubbles in the fluid.

There are a number of instruments that are currently commercially available for measuring the air or gas content in a liquid. Such instruments include BTG's CCA3000, Metso's COLORMAT, Mütek's GAS-60, Papec's PULSE))))AIR, Capella Technology's CAPTAIR, Anton-Paar's CARBO 2100 $CO_2$ analyzer, and CyberMetrics' AIR TESTER.

Mütek's GAS-60, for instance, is said to be useful in the context of minimizing pinholes (voids) in papermaking processes. Pinholes develop when pressure is reduced and dissolved gases—which accumulate in the papermaking process due to mechanical effects and chemical and biological reactions—are released. The GAS 60 is installed on line and is used to determine the gas content of entrained and dissolved gases in pulp suspensions. Having determined gas content, process engineers are able to calculate how much (expensive) deaerating additive should be used, and thus to avoid unnecessarily increased manufacturing costs due to employing too much deaerating additive.

Papec's PULSE))))AIR_V3 is a sensor for the measurement of entrained air and gases in process fluids. It is said to be useful in the pulp and paper industry in connection with machine headboxes and white water systems, coatings, and brownstock washers, in the secondary fiber industry (for effluent treatment), in the paint industry, in oil bottling processes, in the processing of well drilling muds, and in general in any application needing entrained air information.

Anton-Paar's CARBO 2100 $CO_2$ analyzer employs a patented impeller method which is said to make it significantly faster than other commercially available systems for measuring and monitoring tasks and also for regulating the $CO_2$ content of process liquids during production runs in the beer and soft drink industry.

It is believed that all of these instruments adopt a common approach, using Boyle's Law. Boyle's law is given by the equation $$P_1 V_1 = P_2 V_2 \quad (1)$$

where $V_1$ and $V_2$ are the volumes of the entrained gas in the liquid at two different pressures, $P_1$ and $P_2$, respectively. This common approach measures the volume difference $\Delta V = V_1 - V_2$ between $P_1$ and $P_2$, and calculates the volumes of entrained gas, $V_1$ and $V_2$, from Boyle's Law as $$V_1 = \frac{P_2 \Delta V}{P_2 - P_1} \quad \text{and} \quad V_2 = \frac{P_1 \Delta V}{P_2 - P_1}. \quad (2)$$

More general formulas, which correlate the volumes of entrained gas with the pressures being acted upon, can be derived from the Ideal Gas Law as $$P_1 V_1 = n_1 R T_1 \quad (3)$$

and $$P_2 V_2 = n_2 R T_2 \quad (4)$$

where R is the gas constant, and $n_1$, $T_1$ and $n_2$, $T_2$ are moles of entrained gas and temperatures at $P_1$ and $P_2$, respectively. In the case of $n_1 = n_2$ and $T_1 = T_2$, equations (3) and (4) can be simplified to the equation of Boyle's Law given in (1). Hence, Boyle's Law is, in fact, a special case of the Ideal Gas Law and is valid only if the moles of entrained gas and temperatures at $P_1$ and $P_2$ are kept constant.

The present inventors had previously developed a method for the improved control of continuous processes that handle liquids, which method is disclosed in U.S. patent application Ser. No. 10/046,240 (filed Jan. 16, 2002). In that method, the amount of gas in a liquid is determined by subjecting a mixture of an incompressible liquid sample and a compressible gas to three or more different equilibrium pressure states, measuring the temperature and volume of the mixture at each of the pressure states, determining the changes in volume of the mixture between at least two different pairs of pressure states, and calculating the amount of gas in the liquid sample.

SUMMARY OF THE INVENTION

The present invention provides methods and apparatuses for determining the entrained gas content of a 2 or 3 phase fluid. This invention provides means for improving control of continuous processes that handle these fluids, and therefore provides benefits to manufacturers by enabling them to effectively monitor and operate their processes. Data generated by this invention can be used for instance to control the True (air-free) or Apparent (air-containing) Density or Entrained Air content of liquids within optimum ranges, for instance in paper coating processes and in the manufacture of such products as food products (ketchup, ice cream, syrup), personal care products (skin cream, shampoo), pharmaceutical products, paints, petroleum blends, and the like. This invention is useful in any industry where information on entrained gas, and related parameters such as true density of process liquids, is employed.

This invention consists of methods and apparatuses for measuring entrained gas content that is an improvement over prior art. Data generated by this invention minimizes the measurement error caused by the dissolving or exsolving of gases with changes in pressure of a fluid, while providing instantaneous measurement. This is accomplished through apparatuses that measure system conditions at each of two pressure states within a very short period of time. Methods are also defined herein which constitute improvements over the traditional approach.

In one embodiment, this invention provides a method for automatically controlling the output of a continuous process for mixing of a solid or liquid component with a liquid carrier component. The method of the invention includes: a.) setting a quantitative target for weight-% of one or more solids and/or concentration of one or more liquids to the liquid carrier component; b.) continuously mixing said solids and/or liquids with the liquid carrier component; c.) determining the true density, ρ, by employing equation (14)

$$\rho = \frac{1}{V} \tag{14}$$

wherein the gas-free volume of fluid, V, is calculated from equation (12)

$$V = V_{tI} - V_1 = \left(\frac{1}{\rho_1} - \frac{nRT}{P_1}\right) \tag{12}$$

wherein R is the Ideal Gas Law constant, and $$n = \frac{P_1 P_2}{RT(P_2 - P_1)}\left(\frac{1}{\rho_1} - \frac{1}{\rho_2}\right); \tag{11}$$

wherein $P_1$, $P_2$, $\rho_1$, $\rho_2$, and T are measured values; d.) calculating the weight-% of solids and/or the liquid concentration in the mixture from the true density ρ so determined; e.) comparing the calculated weight-% solids or concentration to the target weight-% solids or concentration; and, f.) if the calculated weight-% solids or concentration is greater or less than the target weight-% solids or concentration, lowering or raising the amount of solids or liquids mixed in step b.). For instance, in the context of continuously coating a substrate, the method of this invention comprises: a.) setting a quantitative target for weight-% of one or more solids, e.g. kaolin clay, calcium carbonate, titanium dioxide, or alumina trihydrate, to be coated onto a substrate such as a paper web; b.) continuously applying the solids to the substrate via a carrier fluid; c.) measuring the apparent density of the slurry; d.) determining the true density of the slurry; e.) calculating the weight-% of solids in the slurry as disclosed above; f.) comparing the calculated weight-% solids to the target weight-% solids; and, g.) if the calculated weight-% is greater or less than the target weight-%, lowering or raising the amount of solids applied in step b.).

Another embodiment of the present invention contemplates a method of determining the gas-free true density within a 2 or 3 phase fluid containing an incompressible solid(s) and/or liquid(s) and compressible gas(es). This method involves: subjecting a mixture of incompressible and compressible components to two different pressure states, measuring the temperature, pressure and apparent density of the mixture at each of the two pressure states, and determining the gas-free density of the incompressible component(s) by using equation (14)

$$\rho = \frac{1}{V} \tag{14}$$

wherein the gas-free volume of incompressible component, V, is calculated from equation (12)

$$V = V_{tI} - V_1 = \left(\frac{1}{\rho_1} - \frac{nRT}{P_1}\right) \tag{12}$$

wherein R is the Ideal Gas Law constant, T is the measured fluid temperature, and $$n = \frac{P_1 P_2}{RT(P_2 - P_1)}\left(\frac{1}{\rho_1} - \frac{1}{\rho_2}\right) \tag{11}$$

where $P_1$ and $P_2$ is ambient pressure, and $\rho_1$ and $\rho_2$ are mixture densities. This embodiment of the invention may be applied in a method for automatically controlling the output of a continuous process that requires mixing of a solid or liquid component with a fluid carrier component. In the case where the fluid carrier component is a liquid, this method includes the steps of: a.) setting a quantitative target for gas-free true density of the mixture; b.) continuously mixing said solids and/or liquids with the liquid carrier component; c.) determining the true density, ρ, by employing equation (14)

$$\rho = \frac{1}{V} \tag{14}$$

wherein the gas-free volume of fluid, V, is calculated from equation (12)

$$V = V_{tI} - V_1 = \left(\frac{1}{\rho_1} - \frac{nRT}{P_1}\right) \tag{12}$$

wherein R is the Ideal Gas Law constant, and $$n = \frac{P_1 P_2}{RT(P_2 - P_1)}\left(\frac{1}{\rho_1} - \frac{1}{\rho_2}\right); \tag{11}$$

wherein $P_1$, $P_2$, $\rho_1$, $\rho_2$, and T are measured values; d.) comparing the calculated true density to the target true density; and, e.) if the calculated true density is greater or less than the target true density, lowering or raising the amount of solids or liquids mixed in step b.).

Specific utilizations of the present invention also have application, for instance, in the control of the output of a continuous process for preparing a syrup. This method contemplates: a.) setting a quantitative target for density—or for concentration—of one or more carbohydrates, such as sucrose, and/or carbohydrate-containing liquids, such as aqueous corn syrup and/or aqueous high fructose corn syrup, to be blended into a syrup; b.) continuously supplying the carbohydrate and/or carbohydrate-containing liquid and a dilution liquid to a vessel and mixing said liquids to form a slurry; c.) measuring the apparent density of the slurry at two pressure states; d.) determining the true density of the slurry; e.) comparing the calculated carbohydrate slurry density— or the calculated carbohydrate concentration—to the target carbohydrate slurry density—or to the target carbohydrate concentration; and, f.) if the calculated carbohydrate density or concentration is greater or less than the target carbohydrate density or concentration, lowering or raising the amount of carbohydrates and/or volume of carbohydrate-containing liquids supplied in step b.).

This invention also provides a method of determining the amount of gas entrained within an incompressible liquid component. This method starts with subjecting a gas-liquid mixture to two different pressure states. These two pressure states differ from one another by at least 1.0 psi, preferably at least 1 atmosphere. Alternatively, these two pressure states differ from one another at least to the extent that the two different apparent densities of the liquid differ from one another by at least 0.2%, preferably at least 0.5%. Then one measures the temperature, pressure and apparent density of the mixture at each of the two pressure states, and calculates the volume percentage of said gas in said liquid by using equation (15)

$$x\% = \frac{V_s}{V_s + V} \qquad (15)$$

wherein V is the volume of the gas-free liquid, determined by Equation (12)

$$V = V_{tl} - V_1 = \left(\frac{1}{\rho_1} - \frac{nRT}{P_1}\right) \qquad (12)$$

wherein R is the Ideal Gas Law constant, and $$n = \frac{P_1 P_2}{RT(P_2 - P_1)}\left(\frac{1}{\rho_1} - \frac{1}{\rho_2}\right); \qquad (11)$$

wherein $P_1$, $P_2$, $\rho_1$, $\rho_2$, and T are measured values; and $$V_s = \frac{P_1 V_1 T_s}{P_s T}; \qquad (13)$$

wherein $T_s$ and $P_s$ are standard temperature and pressure, respectively, and $$V_1 = \frac{nRT}{P_1}.$$

Yet another process embodiment of the present invention is a method for controlling the entrained gas content of a liquid or slurry being flow-processed. A typical specific application would involve a slurry of kaolin clay, calcium carbonate, titanium dioxide, and/or alumina trihydrate being supplied as a coating to a paper substrate. This method includes: a.) setting a quantitative target for the free gas content of said liquid or slurry; b.) continuously flowing said liquid or slurry and mixing an antifoam agent therewith; c.) determining the volume percentage of free gas, x %, from equation (15)

$$x\% = \frac{V_s}{V_s + V} \qquad (15)$$

wherein Vs is the volume of free gas under standard conditions and V is the gas-free volume of the liquid carrier component; e.) comparing the calculated free gas content to the target free gas content; and, f.) if the calculated free gas content is greater than the target free gas content, increasing the amount of antifoam agent mixed in step b.).

The present invention also contemplates apparatus embodiments. One such embodiment is a two state measurement apparatus that includes a chamber for process fluid and piping through which said fluid may be pumped, said piping including two core-modules each comprising a density and temperature gauge having a pressure gauge located upstream thereof and a pressure gauge located downstream thereof, said two sectors being operatively joined together by a pressure changing device. Another apparatus embodiment is a single core-module apparatus comprising: a chamber for process fluid and piping through which said fluid may be pumped, said piping including a density and temperature gauge having a pressure gauge located upstream thereof and a pressure gauge located downstream thereof, said piping further including a fluid control valve located upstream of the upstream pressure gauge and a fluid control valve located downstream of the downstream pressure gauge. These apparatus embodiments can be used in a method of obtaining data for use in determining amounts of air entrained in a fluid, by: collecting temperature, pressure and density data at a first pressure level while operating at steady-state conditions; and collecting temperature, pressure and density data at a second pressure level while operating at steady-state conditions.

Moreover, additional apparatus embodiments are contemplated which would simplify those discussed above. One simplified example consists of the elimination of the pressure gauge either upstream or downstream of the density and temperature gauge. In this example, the remaining pressure gauge would be used to predict the pressure at the point of density measurement. Another example consists of incorporating pressure measurement into the combination density and temperature gauge. This new combination density, temperature and pressure gauge would eliminate the need for separate pressure gauge(s). Those skilled in the art can envision a number of continued apparatus simplifications, all of which would provide the required data, which consists of density, temperature and pressure at two pressure levels.

BRIEF DESCRIPTION OF THE DRAWINGS

The present invention will be more fully understood from the detailed description given hereinbelow and from the accompanying drawings. These drawings are provided by way of illustration only, and thus do not in any way limit the present invention. In particular, it is noted that the hardware configurations depicted in these drawings are illustrative only (and not to scale). Those skilled in the art can easily develop alternative hardware configurations that will likewise obtain the benefits of the present invention.

FIG. 7 is a schematic representation of a coating system including an application of this invention installed in a sample line.

DETAILED DESCRIPTION OF THE INVENTION

Figure 1:
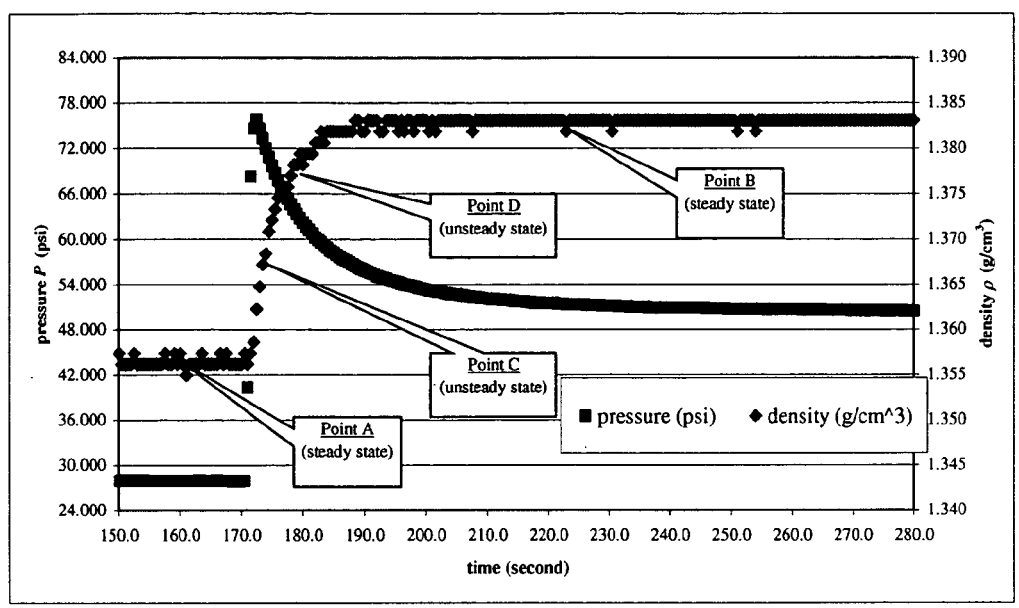
FIG. 1 shows the experimental curves of the density of a coating slurry, which contains entrained air, as a function of ambient pressure at steady and unsteady states.

The following symbols are used in connection with the description and claims pertaining to the present invention:

$P_1$, $P_2$: Ambient pressures at which the apparent densities of the fluid are measured. These pressures can be approximated by the average of the inlet and outlet pressures of a density meter $V_1$, $V_2$: Volumes of the free gas entrained into a fluid at $P_1$ and $P_2$, respectively $n_1$, $n_2$: Moles of the free gas entrained into a fluid at $P_1$ and $P_2$, respectively $\rho_1$, $\rho_2$: Apparent densities of the fluid that contains entrained gas being measured at $P_1$ and $P_2$, respectively $\rho$: Gas-free true density of the fluid V: Gas-free volume of the fluid $V_{t1}$: Total volume of the fluid that contains entrained gas being measured at $P_1$ $\Delta V$: The volume difference of the free gas between $P_1$ and $P_2$ (a measurable value)

R: The constant of the Ideal Gas Law

T: Temperature of the fluid measured by a temperature sensor, assuming that the temperature is kept constant between the two measurement points ($T=T_1=T_2$)

$P_s$, $T_s$: Atmospheric pressure, $P_s=1$ atm (14.7 psi) and standard temperature, $T_s=0°$ C.

$n_s$, $V_s$: Moles and volume of free gas at $P_s$ and $T_s$ x %: Volume percentage of free gas at $P_s$ and $T_s$.

The discussion of this invention begins with a conceptual discussion of the behavior of an entrained air containing 2 or 3 phase fluid. It is commonly understood that liquids and solids are incompressible, and that gases are compressible. It is also commonly understood that when an entrained air containing fluid is subject to a change in pressure, the fluid will undergo a change in volume. These facts known, it becomes obvious that only the gas phase will undergo a volumetric change. Further, the behavior of gases can be described, under most conditions, by the Ideal Gas Law, $PV=nRT$. As defined by this law, such a change in pressure can affect the volume of the gas, the temperature of the gas, or both. (NOTE: Under temperature and pressure extremes, real gas behavior begins to deviate from the Ideal Gas Law. In these cases, real gas equations of state, such as the Benedict-Webb-Rubin Equation, the Cubic Equation of State, or the Compressibility Factor Equation of State will need to be used in place of the Ideal Gas Law.) Under conditions where the Ideal Gas Law applies, it is safe to assume that a change in pressure does not induce a significant change in temperature.

As such, the physical states before and after this change in pressure can be described by the ideal gas law to give the volumes of free gas in a fluid at different pressures $$V_1 = \frac{n_1 RT}{P_1} \tag{6}$$

$$V_2 = \frac{n_2 RT}{P_2} \tag{7}$$

NOTE: assuming $T=T_1=T_2$.

As discussed above, the volume difference, $\Delta V$ between $P_1-P_2$ is the reflection of the change in volume of the entrained gas only, since the non-gaseous components are incompressible. Equation (6) and (7) can therefore be combined to $$V_1 - V_2 = \Delta V = \left(\frac{n_1}{P_1} - \frac{n_2}{P_2}\right)RT. \tag{8}$$

If the moles of dissolved/exsolved gas, $\Delta n$, is relatively small at a dynamic state, then $\Delta n$ can be neglected. This leads to $n_1 \approx n_2 \approx n$, and (8) can therefore be simplified as $$\Delta V = \left(\frac{1}{P_1} - \frac{1}{P_2}\right)nRT. \tag{9}$$

By assuming that the unit of mass equals 1, the relationship between the difference of volume and difference of reciprocal density can readily be found as $$\Delta V = \frac{1}{\rho_1} - \frac{1}{\rho_2}. \tag{10}$$

Equation (9) and (10) can be rewritten as $$n = \frac{P_1 P_2}{RT(P_2 - P_1)} \left( \frac{1}{\rho_1} - \frac{1}{\rho_2} \right); \quad (11)$$

which allows for the determination of n directly from system measurements.

The gas-free volume of the fluid at $P_1$ is then $$V = V_{tl} - V_1 = \frac{1}{\rho_1} - \frac{nRT}{P_1}. \quad (12)$$

These results can then be used to convert the volume of free gas to standard conditions through the universally applicable $$V_s = \frac{P_1 V_1 T_s}{P_s T}. \quad (13)$$

The gas-free, true density, $\rho$, and the volume percentage of free gas, x %, can also be determined as $$\rho = \frac{1}{V} \quad (14)$$

and $$x\% = \frac{V_s}{V_s + V}. \quad (15)$$

The precision of the above approach primarily depends on the amount of dissolved/exsolved gas between states 1 and 2. As a result, the less the amount of dissolved/exsolved gas, the less the error will be.

Earlier experiments had demonstrated, as the examples shown in FIG. 1, that change of ambient pressure would cause change of liquid density as a result of free gas dissolving into or exsolving from the liquid. At a steady state, where the process of gas dissolving/exsolving is COMPLETE between two steady state points, for example Point A and B in FIG. 1, the amount of dissolved/exsolved gas would be maximized. In contrast, at a dynamic state, where the process of gas dissolving/exsolving is INCOMPLETE, e.g., between Point C and D in FIG. 1, only a portion of the totally dissolvable gas will be dissolved into or exsolved from the liquid. The dissolved/exsolved portion of gas at a dynamic state, for example between two unsteady-state points, C and D, is a function of not only the pressure difference, $P_D - P_C$, but also the time elapsed between Point C and D. For a fixed pressure difference, reducing the time elapsed between the two measurement points would essentially reduce the dissolved/exsolved portion of gas, which would essentially reduce the corresponding error on entrained gas calculation.

In this preceding example, it is assumed that the ambient pressures, $P_1$ and $P_2$, are representative of the pressure of the entrained gases in the 2 or 3 phase fluid at measurement points 1 and 2, respectively. Under certain conditions this assumption can be in error. Specifically, as the size of the entrained air bubbles get very small, e.g. bubble radius <1 mm, then the pressure within the entrained gas bubble increases significantly as defined by the Young-LaPlace Equation. In these cases, this gas bubble pressure should be compensated for.

INDUSTRIAL APPLICABILITY

While the focus of the discussion in this application is often on "air", this invention can also be applied to the determination of amounts of any gas that is entrained in any 2 or 3 phase fluid. For instance, one important application of this invention is extraction of crude oil from hydrocarbon wells, in which more volatile organics than air is entrained in the liquid carrier. Likewise, the present invention can be applied to processes conducted under an inert atmosphere, in which the gas may be nitrogen, helium, or another "inert" gas instead of (or in addition to) air.

U.S. Pat. No. 6,496,781 B1, entitled IMPROVED MIXTURE CONCENTRATION CONTROL IN MANUFACTURING PROCESSES, issued on Dec. 17, 2002. Some (but by no means all) embodiments of the present invention can be used to make certain control methods described in that patent even more accurate. Accordingly, the entire disclosure of that patent is hereby expressly incorporated by reference. Also, the present inventors are filing concurrently herewith an application entitled REAL TIME DETERMINATION OF GAS SOLUBILITY AND RELATED PARAMETERS IN MANUFACTURING PROCESSES. That application, which is identified as Attorney Docket No. 0011-0401P, makes use of gas solubility determination in order to implement its invention. The entire disclosure of that application is hereby expressly incorporated by reference.

EXAMPLES

Example 1

Figure 2:
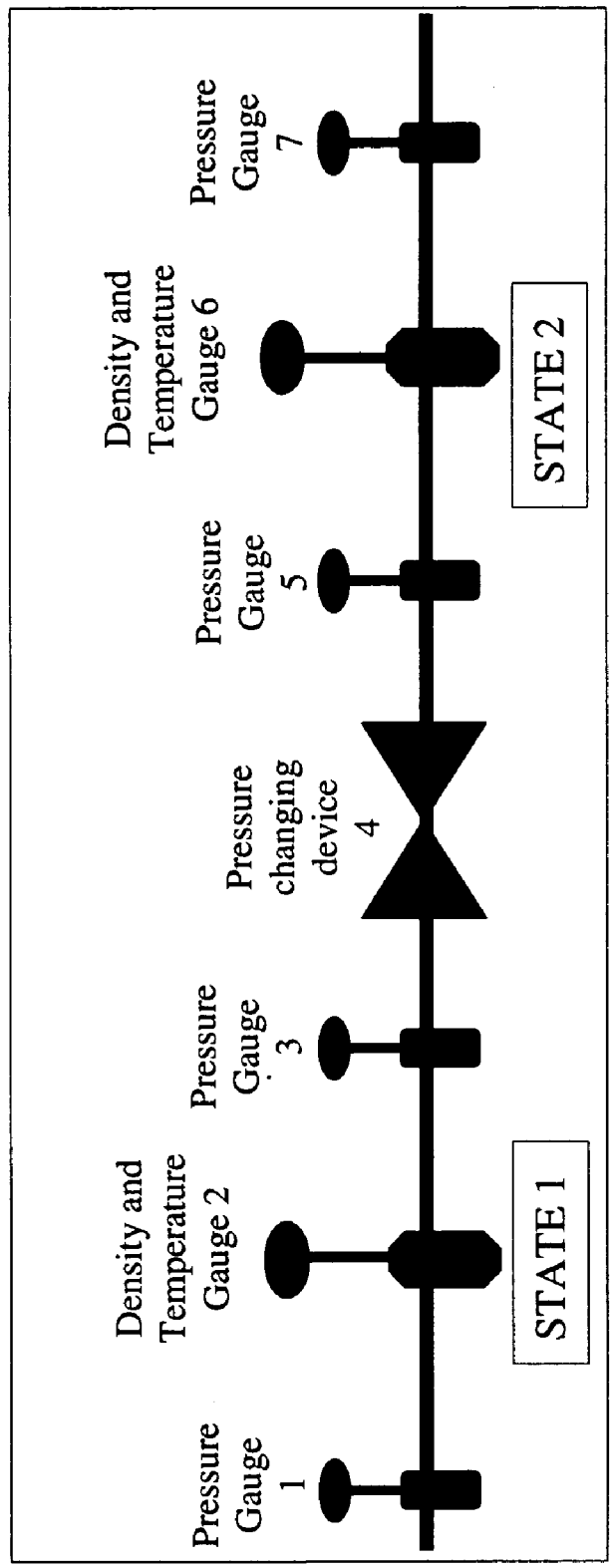
FIG. 2 is a schematic representation of an apparatus embodiment of the present invention. This embodiment continuously measures state conditions of pressure difference, temperature, and density at two different pressure states.
Figure 4:
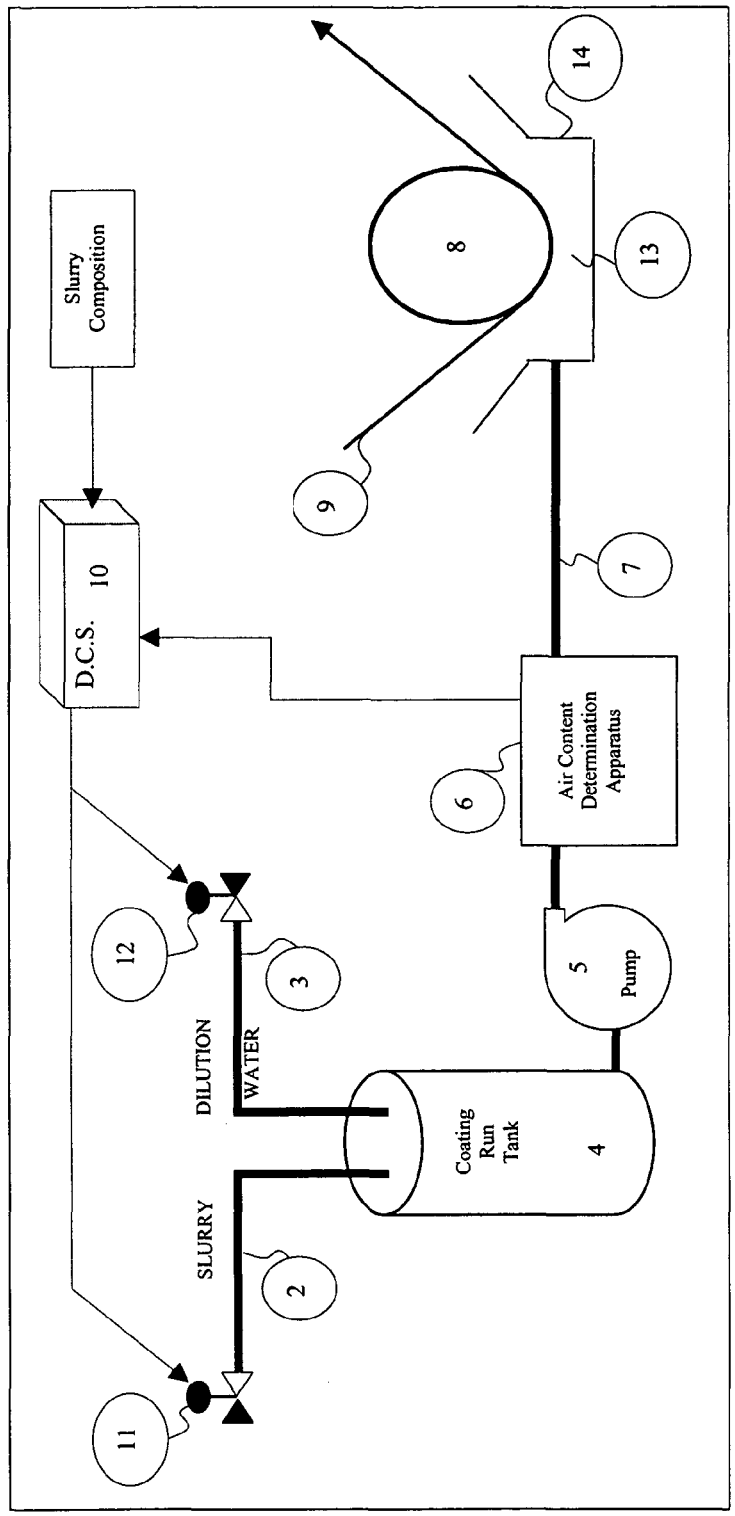
FIG. 4 is a schematic representation of an industrial coating line having an on-line measurement system in accordance with the present invention integrated into it.
Figure 5:
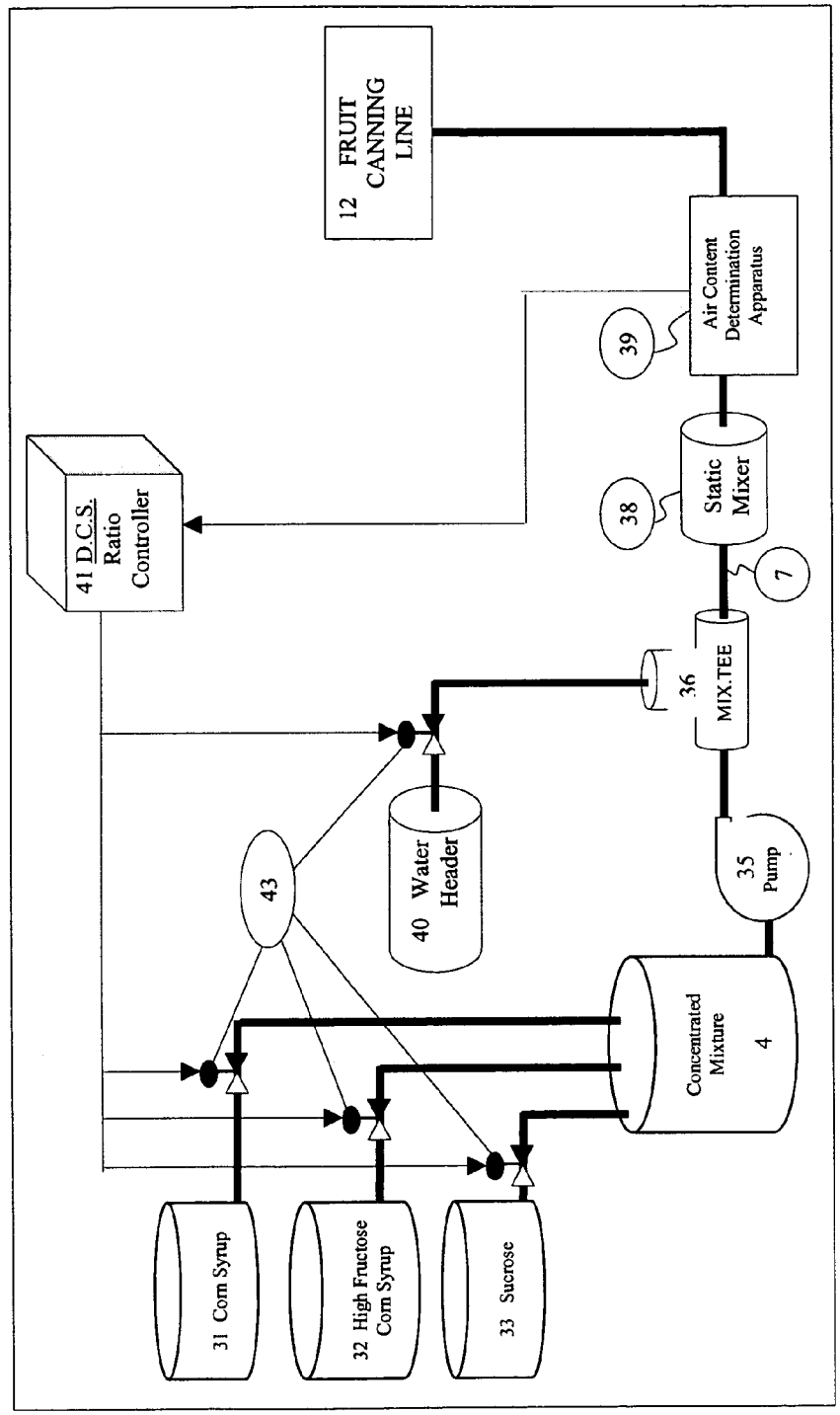
FIG. 5 is a schematic representation of a fruit canning line having a Distributed Control System operating in accordance with this invention.
Figure 6:
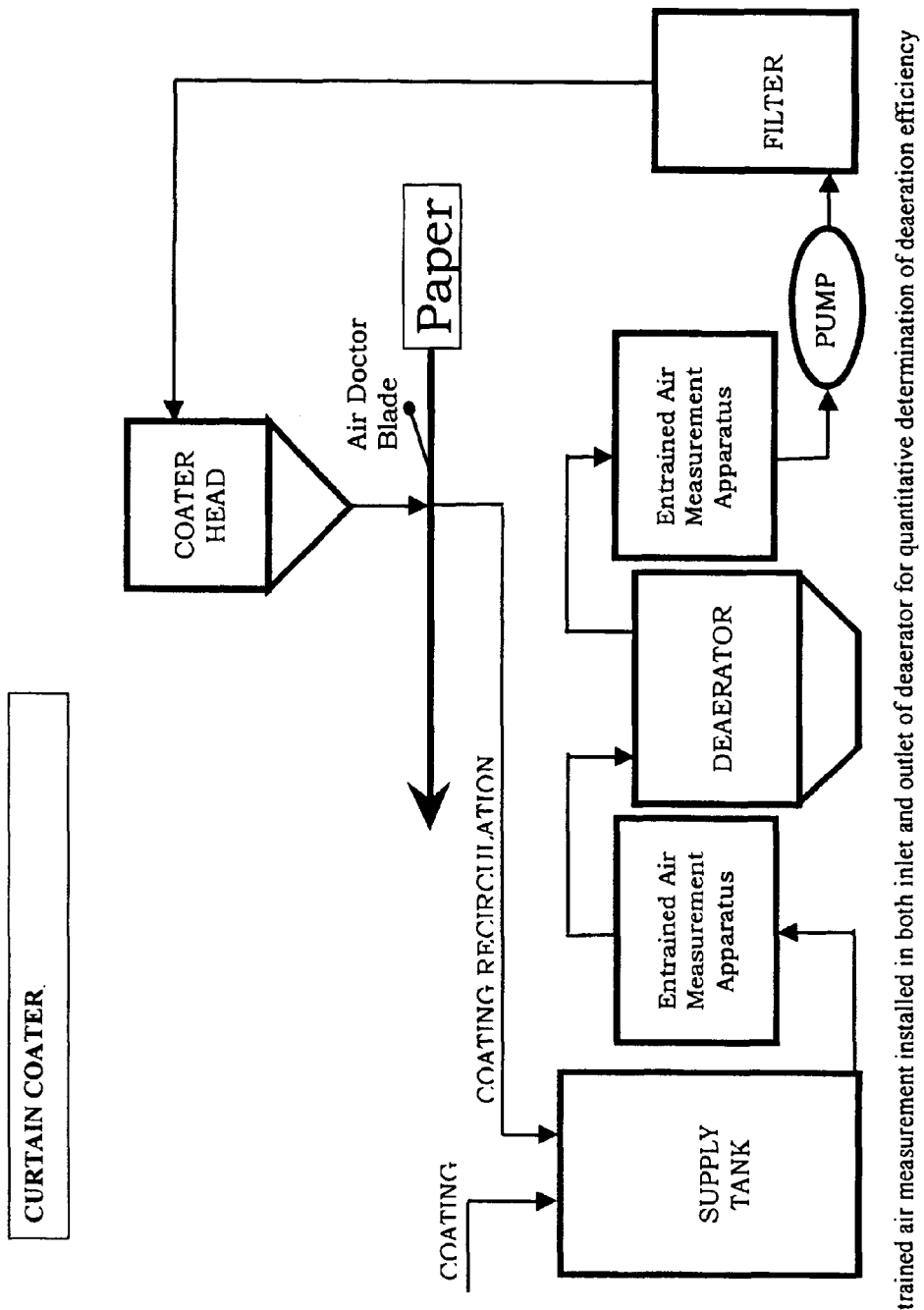
FIG. 6 is a schematic representation of a coating system including two applications of this invention installed directly in the process flow line.

Dual Core-Module Apparatus for the Measurement of Entrained Air Content and True Density in Fluids on a Continuous Basis FIG. 2 depicts one particular hardware configuration used to dynamically measure state conditions that can be employed to practice the invention disclosed herein. This embodiment requires the measurement of fluid density and temperature at each of two pressure states, as well as measurement of the pressure at which the density was measured. The cost of this hardware configuration is comparatively high, due to its dual core-modules, that is, a coriolis meter and two pressure sensors for each of the two modules. The embodiment of FIG. 2 can be positioned, for example, within a process flow line of a manufacturing process, as shown in FIGS. 4, 5, and 6. In another application, this apparatus could be positioned in a piping sample line that runs parallel to the manufacturing process flow line, such as in FIG. 7.

In the embodiment depicted in FIG. 2, the density and temperature at the first pressure state (STATE 1) are measured with instrumentation familiar to those skilled in the art, such as a combination density, temperature, and mass flow meter, density and temperature gauge 2, operating on the principles of coriolis technology. To determine the pressure at which this density is measured, a variety of techniques can be applied. In this embodiment, the system pressure is measured using pressure gauges 1 and 3 both before and after the density and temperature gauge 2. In this application, the average pressure across 2 is used as the desired pressure measurement. However, the method for determining the required pressure measurement could be based on the design of device 2. This value could be obtained through modeling techniques, or, with an advanced combination version of instrument 2 that includes a pressure measurement.

The process fluid then passes through an optional pressure changing device 4 such as a partially closed valve or an orifice. This device is not always necessary since the process fluid may experience a sufficient loss of pressure due to normal pressure drop related to fluid transport through a piping system. Sufficient pressure drop is defined as that which allows for a measurable change in density of the fluid being measured. The fluid then passes through a series of instruments 5, 6, and 7 that perform in the same fashion as described above for instruments 1, 2, and 3.

These two sets of pressure, temperature, and density data may then be used in the processes of the present invention, which are described in detail hereinabove.

Example 2

Figure 3:
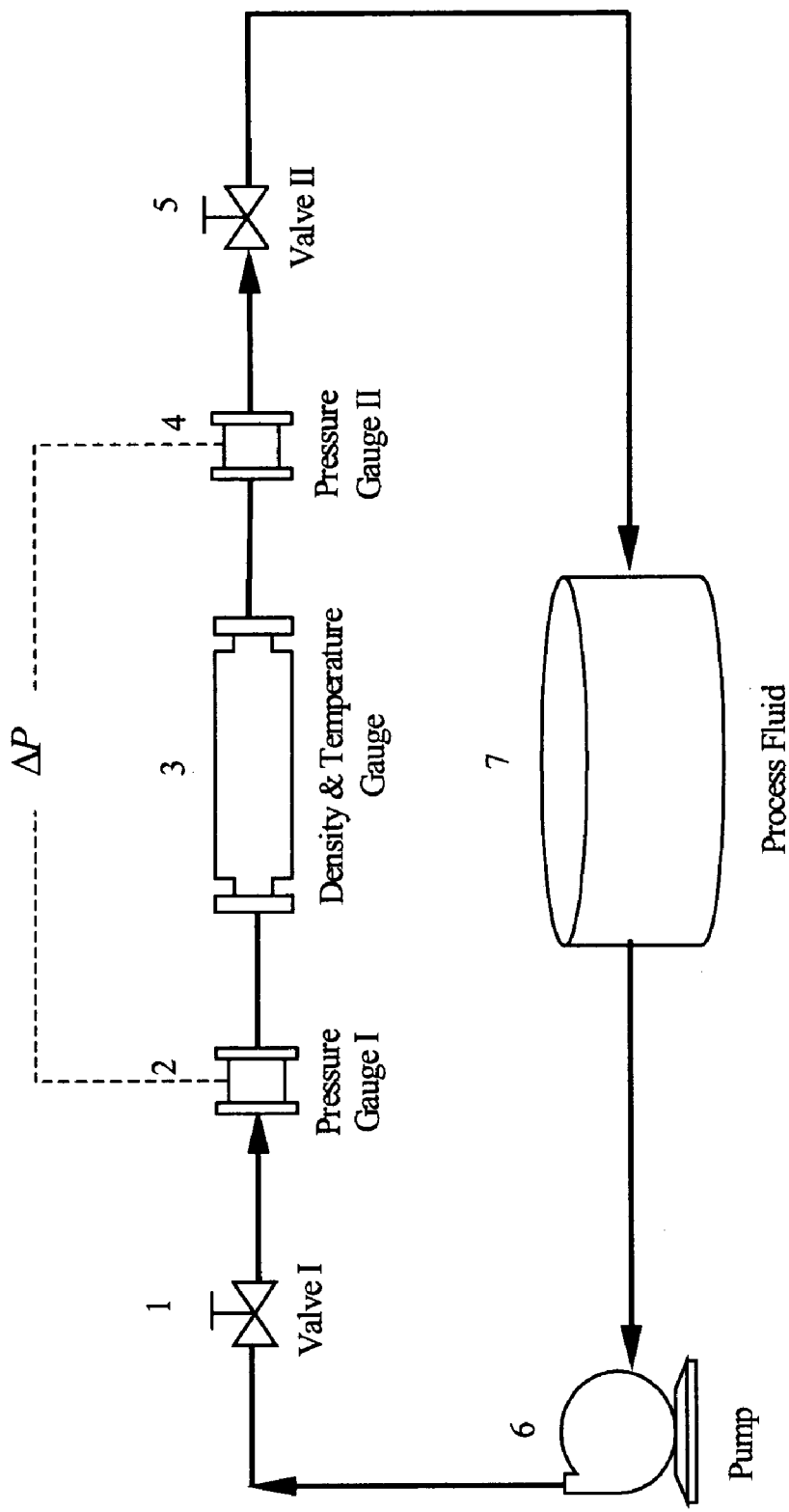
FIG. 3 is a schematic representation of another apparatus embodiment of the present invention. This embodiment dynamically measures density, pressure difference, and temperature at two different levels of pressures, which can be manipulated either by altering the flow rate with an optional pump or by changing the up/downstream pressures with the valves opened correspondingly.

Single Core-Module Apparatus for the Measurement of Entrained Air Content and True Density in Fluids at a Dynamic State FIG. 3 is a schematic of another particular hardware configuration used to dynamically measure the state conditions needed to practice the invention disclosed herein. The required parameters of measurement are fluid density and temperature at two different levels of pressure, as well as the pressure upon which the density values are determined. The cost of this hardware configuration is comparatively low, since only a single core-module is required, that is, one coriolis meter and two pressure sensors. The embodiment of FIG. 3 can be positioned similarly to that illustrated in the previous example, within a process flow line of a manufacturing process, as shown in FIGS. 4, 5, and 6, or parallel to the manufacturing process flow line, as depicted in FIG. 7.

The output of density and temperature in this embodiment, as in Example 1, is provided by density and temperature gauge 3. This device can be an instrument familiar to those skilled in the art, such as a coriolis meter. The pressure upon which the density value is determined can be measured with different types of techniques. In this application, the required pressure can be estimated, as depicted in Example 1, based on the average of the pressure measurements from pressure gauges 2 and 4, which are positioned before and after device 3, respectively. To minimize the interference on regular flow streamlines, which might cause additional unwanted pressure changes, the sensors of pressure gauges 2 and 4 can, for instance, be mounted flush with the inner surface of the pipe. The determination of the required pressure can also be coupled with the design of density and pressure gauge 3 itself. This can be achieved, for example, by a more sophisticated instrument 3 that incorporates a couple of internally mounted pressure sensors.

The first set of density, pressure, and temperature data can dynamically be measured at a relatively low pressure. The second set data can then dynamically be measured, right after the first measurement, at a relatively high pressure. Such an order of measurement can be accomplished, for example, by reducing the flow rate with an optional pump or by increasing upstream pressure with the valves opened widely. The order of measurements can also be reversed with the respective devices set accordingly. Depending on the desired flexibility, functionality, and equipment cost, a real measurement system can comprise of either devices 1, 2, 3, 4 or devices 1, 2, 3, 4, 5 or devices 2, 3, 4, 6 or any other combination of those as required by this embodiment. These two sets of data can then be put into execution of the respective algorithms (11)-(15) for a quick estimation on entrained air.

Example 3

Improved Water Cut Determination of the Outflow at a Hydrocarbon Well Site

Yet another application of this invention is the continuous measurement of the mass fraction of water (Water Cut) of the outflow from hydrocarbon wells. This embodiment, such as that depicted in FIG. 2, requires the measurement of fluid density at each of two pressure states, as well as measurements of the temperature and pressure at which these densities were measured. Additionally, this embodiment requires that the individual densities of the water-phase and oil-phase be supplied via alternative means. As an example, these individual phase densities could be tested in a laboratory from samples drawn at the well site. As an alternative example, these densities could be measured by in-line instrumentation, of which this invention is an example, at a point downstream that occurs after the water-phase and oil-phase are separated. A distributed control system then converts these inputs of water-phase density, oil-phase density, and true density of the mixture to Water Cut of the mixture. This is accomplished with the simple relationship:

$$\frac{1}{TrueDensityofMixture} = \frac{WaterCut}{WaterPhaseDensity} + \frac{(1 - WaterCut)}{OilPhaseDensity}$$

which becomes:

$$WaterCut = \frac{WaterPhaseDensity(OilPhaseDensity - TrueDensityofMixture)}{TrueDensityofMixture(OilPhaseDensity - WaterPhaseDensity)}$$

which applies to volumetrically additive components such as oil and water.

Example 4

Improved, Real-Time Characterization of Dry Powders in an Air-Fluidized Stream

A common method of describing dry powders or other dry, granular solids is to refer to their Bulk Density. The bulk density represents the density of the powder as it is packed into a volume of space. This density does not represent the true density of the solid, because it is artificially reduced by the air space that exists between the solid particles. The obvious disadvantage of classifying powders in this way is that their bulk density is affected by both the solid particle's density and the amount of air space present in the packed powder, which is ultimately dependent on the particle size.

An improvement to bulk density is the actual, or true, density of the solid material. True density more specifically classifies the material because it is only dependent on the solid itself and not it's particle size. Unfortunately, to date there is no on-line method for measuring the true density of powders.

Utilizing this invention in an air-fluidized powder stream results in the measurement of the true density of the solid material of the powder.

Powders are commonly transported in a stream of air. Air blowers provide high volumes of air which act as the transport fluid in which the powders are suspended. When applying the practice of this invention to this 2-phase, solid-gas fluid stream, equation (14) represents the true density of the dry solid material. As a result, this invention provides a simple, on-line method for determining the true solid particle density for materials in powder form.

Example 5

Optimizing Deaerator Operations in Coating Processes

Certain coating processing environments require that excessive entrained gases should be removed from the coating liquids prior to distributing the coating liquids onto the substrate. This is because entrained gas bubbles, especially larger ones, deteriorate coating quality and result in coating defects such as intolerable pinholes. Deaeration is therefore highly desirable where excessive entrained gas bubbles are presented. With the rapidly advancing technology of high-speed jet and curtain coating, in which thin liquid sheets are either injected or allowed to fall freely onto a substrate to be coated, any entrained large gas bubbles may even cause the breakdown of the integrity of the free coating liquid sheet. Thus, deaeration is a requirement for high-speed jet and curtain coating applications.

One application of the present invention, as depicted in FIG. 6 "Entrained air measurement installed in both inlet and outlet of deaerator for quantitative determination of deaeration efficiency", incorporates this invention both before and after the deaerator in a curtain coater piping system. The percent entrained air measurements provided before and after the deaerator unit improve the manufacturing process by enabling optimization of the deaerator unit, based upon determination of its process-specific deaeration efficiency. Process parameter adjustments (degree of vacuum, rotation speed of the deaerator, etc.) are made based upon the differences in "before" and "after" values. The output from the upstream apparatus embodiment is compared to that from the downstream apparatus embodiment to calculate the efficiency of air removal, and process parameters are changed to enhance the amount of air removed by the deaerator unit.

In addition to coating processes, other typical applications for deaerator systems include the packaging of ointments, creams, lotions, toothpaste, mayonnaise, ketchup, and lubricating grease.

Example 6

Quality Control in Coating Application Systems

In Example 5, the deaerator units can be used to minimize waste costs due to the manufacture of off-quality product. When the level of percent entrained air that causes quality defects in a product is known, then the measured percent entrained air can be used to shutdown production, or can be monitored to predict when off-quality production may soon occur. It is not necessary to incorporate two (that is, "before" and "after") apparatus embodiments of this invention into processing systems (as illustrated in FIG. 6). Instead, the system could be configured with a single apparatus embodiment of this invention, located for instance after the deaerator unit, as depicted in FIG. 7. The system can then be configured to set off an alarm if too great a quantity of air bubbles are detected in the slurry downstream of the deaerator unit. With a processing system alarmed in this manner, the amount of expensive defoaming agent can be kept low, but can be immediately increased as soon as the alarm is triggered.

Also, since 100% deaeration is generally impracticable and unnecessary, an accurate measurement of the permissible maximum percent entrained air that the coaters can tolerate without causing noticeable quality problems enables controlling the coaters to run within acceptable operation windows.

As noted above, other typical applications for deaerator system improvements in accordance with this invention include—without limitation—the packaging of ointments, creams, lotions, toothpaste, mayonnaise, ketchup, and lubricating grease.

Example 7

Percent Solids Control in Coating Substrates

One application of this invention is the on-line determination of the true density of a coating slurry applied to a substrate such as a paper web. The true density is then used to predict coating percent solids as described in U.S. Pat. No. 6,496,781 B1, entitled IMPROVED MIXTURE CONCENTRATION CONTROL IN MANUFACTURING PROCESSES, referenced above. This coating percent solids data is then used to more efficiently control the application of the coating slurry onto the paper web. A significant processing benefit is realized due to the fact that percent solids is often the primary coating property affecting the quantity of coating being applied to the paper web. As the accuracy of the measurement of true density is improved, the accuracy of predicted coating slurry percent solids is improved. As the accuracy of coating slurry percent solids is improved, the control of the quantity of the coating slurry is also improved.

Paper coating slurries usually contain at least one and often all three of the following materials: pigments, binders, and additives. Generally, pigments constitute the main component of paper coating slurries. Pigments commonly used in current paper and board applications are kaolin clay, calcium carbonate, titanium dioxide, alumina trihydrate, synthetic and structured pigments, and so on. Binders normally constitute just a small part of paper coating slurries. Besides their role of binding, they also serve to fill up voids in the cellulose/pigment matrix. Natural binders include starch, soy protein, casein, while synthetic binders include styrene-butadiene latex, polyvinyl acetate latex, vinyl acrylic latex, polyvinyl alcohol, and so on. Although coating additives constitute only a small percent of paper coating slurries, they form a large, complex group with each serving a particular function. Coating additives include dispersants, viscosity modifier or water-holding agents, lubricants, crosslinkers or insolubilizers, biocides, pH control agents, repellents, optical brighteners, dyes, and foam control agents. This invention enables improved management of processes for applying any combinations of such materials.

Specifically, for a production environment in which the following production information is available to an on-line control system—1) the dry coating component ratio, 2) the relationship between the Additive Volume Coefficient of each coating component and the concentration of the component in the mixture, 3) the true density of each coating solid or solute component, and 4) the true density as determined in accordance with this invention—the following calculations are employed within the control system to determine the coating slurry percent solids:

a. Determine the true density of the coating slurry by means of the technique provided by the present invention;
b. Using that true density determination, estimate (more accurately) the coating slurry percent solids by the method described in U.S. Pat. No. 6,496,781 B1; and
c. Employ the (more accurate) coating slurry percent solids estimate to optimize coater operations.

Broadly speaking, this specific embodiment of the present invention provides a method of monitoring a continuous coating of a substrate with solids delivered in a slurry of water. A first step in the present application comprises setting a target solids weight-% for the slurry. That is, in order to practice the present invention, one must determine what the solids weight-% in the coating slurry should be in order to provide a coated substrate having the desired properties. Having determined that target solids weight-%, one proceeds to provide a continuous industrial coating line with appropriate volumes of water and with appropriate amounts of the solid or solids with which it is desired to coat the substrate.

In order to implement the present invention, one may modify a conventional industrial coating line by inserting an apparatus embodiment of the present invention into it. Referring to FIG. 4, industrial coating line 1 comprises coating run tank 4, pump 5, and coating slurry bath 14. These elements are linked by piping 7. A roll 8 is partially immersed in bath 14, and substrate 9 travels around the roll through the bath where it contacts coating slurry 13 (which includes a liquid carrier component). An apparatus embodiment of the present invention 6, along with the composition of the coating slurry, are fed as inputs into distributed control system 10. In accordance with the present invention, the distributed control system 10 converts these inputs to the true density of the coating. This true density is then converted into solids weight-% of the coating, making use of the procedure described in U.S. Pat. No. 6,496,781 B1, referenced above. This actual solids weight-% determination, in turn, is compared to the target coating solids weight-% for the slurry. If there is a difference, the distributed control system 10 adjusts coating inflows 2 and 3 with flow control valves 11 and 12 as appropriate to correct this difference.

This Example represents use in one particular paper coating process. However, those skilled in the art will realize that this invention can be applied similarly to virtually any other commercial coating methods and in any other process environments where information on true liquid density or % solids is desirable.

Example 8

Improved Control of Syrup Makedown (TRUE LIQUID DENSITY)

Another application of this invention is the on-line determination of the concentration of sugars dissolved in water, commonly referred to as ° Brix. This measurement is used to control the process of making syrup such as that used with canned fruit. Such a control provides the food manufacturer with the ability to control the product's sugar content. This provides the customer with a consistent taste over time, and/or the knowledge of a sugar content maximum, which is important to those with certain health conditions.

Current methods of measuring ° Brix include converting the measurement of syrup density to ° Brix. This can be done using long-standing conversion tables available in the public domain. When incorporated into a control system, these conversions can occur on-line, thus providing real-time ° Brix measurement. However, the accuracy of the density measurement is often unsatisfactory due to the presence of air entrained in the syrup being measured. In such a case, incorporating an apparatus of embodying the present invention into a syrup piping system, as shown in FIG. 5, provides more accurate control of the finished product than can be achieved in the absence of this invention.

When used in conjunction with an on-line control system as described in Example 4, the present invention provides a method for accurately converting density to ° Brix by supplying measured density values having improved accuracy. The first step in this application comprises setting a target ° Brix for the dilute syrup. Next, the flows of concentrated syrup and dilution water are controlled to maintain the dilute syrup at the targeted ° Brix.

Referring to FIG. 5, concentrated syrups 31, 32, and 33 are blended together as a concentrated mixture 4 in a ratio controlled by flow valves 43. The concentrated mixture travels through pump 35 to mixing tee 36 where it is blended with water from supply header 40. This dilute mixture travels through static mixer 38 to an apparatus embodiment of the present invention 39. The distributed control system 41 then converts the inputs to ° Brix, making use of the air-free true densities of the dilute syrup provided by the application of this invention. This, in turn, is compared to the target ° Brix. If a difference exists, the distributed control system adjusts the flow control valves 33 and 34 to correct the discrepancy.

The invention being thus described, it will be evident that the same may be varied in many ways. Such variations are not to be regarded as a departure from the spirit and scope of the invention, and all such modifications as would be apparent to one skilled in the art likewise constitute a part of the present invention.

What is claimed is:

1. A method for automatically controlling the output of a continuous process that requires mixing of a solid or liquid component with a liquid carrier component, the method comprising the steps of:

a.) setting a quantitative target for weight-% of one or more solids and/or concentration of one or more liquids to the liquid carrier component;
b.) continuously mixing said solids and/or liquids with the liquid carrier component;
c.) determining the true density, $\rho$, by employing equation (14)

$$\rho = \frac{1}{V} \tag{14}$$

wherein the gas-free volume of fluid, V, is calculated from the equation $$V = \left( \frac{1}{\rho_1} - \left( \frac{P_2}{P_1 - P_2} \right) - \left( \frac{1}{\rho_1} - \frac{1}{\rho_2} \right) \right)$$

wherein the solid/liquid mixture with the liquid carrier component is subjected to two different pressures $P_1$, $P_2$ and wherein the corresponding densities $\rho_1$ and $\rho_2$ are measured values;

d.) calculating the weight-% of solids and/or the liquid concentration in the mixture from the true density $\rho$ so determined;

e.) comparing the calculated weight-% solids or concentration to the target weight-% solids or concentration; and, f.) if the calculated weight-% solids or concentration is greater or less than the target weight-% solids or concentration, lowering or raising the amount of solids or liquids mixed in step b.).

2. The method of claim 1 for continuously coating a substrate, which method comprises:

a.) setting a quantitative target for weight-% of one or more solids to be coated onto a substrate;

b.) continuously applying the solids to the substrate via a carrier fluid;

c.) measuring the apparent density of the slurry;

d.) determining the true density of the slurry;

e.) calculating the weight-% of solids in the slurry in the manner recited in claim 1;

f.) comparing the calculated weight-% solids to the target weight-% solids; and, g.) if the calculated weight-% is greater or less than the target weight-%, lowering or raising the amount of solids applied in step b.).

3. The method of claim 2, in which the substrate is a paper web and the solids component comprises kaolin clay, calcium carbonate, titanium dioxide, or alumina trihydrate.

4. The method of claim 1 for controlling the output of a continuous process for preparing a syrup, which method comprises:

a.) setting a quantitative target for a concentration of one or more carbohydrates and/or carbohydrate-containing liquids to be blended into a syrup;

b.) continuously supplying the carbohydrate and/or carbohydrate-containing liquid and a dilution liquid to a vessel and mixing said liquids to form a slurry;

c.) measuring the apparent density of the slurry;

d.) determining the true density of the slurry;

e.) converting this true density to the calculated carbohydrate concentration;

f.) comparing the calculated carbohydrate concentration to the target carbohydrate concentration; and, g.) if the calculated carbohydrate concentration is greater or less than the target carbohydrate concentration, lowering or raising the amount of carbohydrates and/or volume of carbohydrate-containing liquids supplied in step b.).

5. The method of claim 4, in which carbohydrates comprising sucrose and carbohydrate-containing liquids comprising corn syrup and high fructose corn syrup are mixed with a dilution liquid comprising water.

* * * * *